United States Patent [19]

Shah

[11] Patent Number: 5,004,647
[45] Date of Patent: Apr. 2, 1991

[54] OXYGEN BARRIER BIAXIALLY ORIENTED FILM

[75] Inventor: Gautam P. Shah, Simpsonville, S.C.

[73] Assignee: W. R. Grace & Co.-Conn., Duncan, S.C.

[21] Appl. No.: 199,899

[22] Filed: May 27, 1988

Related U.S. Application Data

[63] Continuation of Ser. No. 842,321, Mar. 21, 1986, abandoned.

[51] Int. Cl.$^5$ ............................................. B30B 7/12
[52] U.S. Cl. ................................. 428/349; 428/475.5; 428/475.8; 428/516; 428/521; 428/910
[58] Field of Search ............... 428/516, 521, 910, 349, 428/475.5, 475.8

[56] References Cited

U.S. PATENT DOCUMENTS

| | | | |
|---|---|---|---|
| 3,924,051 | 12/1975 | Wiggins et al. | 428/520 |
| 4,064,296 | 12/1977 | Bornstein et al. | |
| 4,182,457 | 1/1980 | Yamada et al. | 215/1 |
| 4,254,169 | 3/1981 | Schroeder | 428/35 |
| 4,284,674 | 8/1981 | Sheptak | 428/69 |
| 4,347,332 | 8/1982 | Odorzynski | |
| 4,400,428 | 8/1983 | Rosenthal | 428/349 |
| 4,405,667 | 9/1983 | Christensen et al. | 428/35 |
| 4,407,873 | 10/1983 | Christensen et al. | 428/35 |
| 4,421,823 | 12/1983 | Theisen et al. | 428/349 |
| 4,457,960 | 7/1984 | Newsome | |
| 4,464,443 | 8/1984 | Farrell et al. | |
| 4,495,249 | 1/1985 | Ohya et al. | |
| 4,501,797 | 2/1985 | Super et al. | |
| 4,511,610 | 4/1985 | Yazaki et al. | 428/35 |
| 4,532,189 | 7/1985 | Mueller | 428/516 |
| 4,547,433 | 10/1985 | Ohya et al. | 428/516 |
| 4,557,780 | 12/1985 | Newsome et al. | 156/244 |
| 4,561,920 | 12/1985 | Foster | 156/244 |
| 4,572,854 | 2/1986 | Dallmann et al. | 428/35 |
| 4,588,648 | 5/1986 | Krueger et al. | 428/475 |
| 4,590,126 | 5/1986 | Andersson | |
| 4,615,922 | 10/1986 | Newsome et al. | |
| 4,640,856 | 2/1987 | Ferguson et al. | 428/36 |
| 4,643,926 | 2/1987 | Mueller | 428/35 |
| 4,671,987 | 6/1987 | Knott II et al. | |
| 4,686,148 | 8/1987 | Havens | |
| 4,690,679 | 9/1987 | Mattingly, III | |
| 4,729,556 | 3/1988 | Warren | 428/349 |
| 4,755,402 | 7/1988 | Oberle | 428/35 |
| 4,755,436 | 7/1988 | Garland | 428/518 |
| 4,778,715 | 10/1988 | Ferguson et al. | 428/218 |
| 4,797,235 | 1/1989 | Garland et al. | 264/22 |

(List continued on next page.)

FOREIGN PATENT DOCUMENTS

| | | |
|---|---|---|
| 0151462 | 8/1985 | European Pat. Off. |
| 0169640 | 1/1986 | European Pat. Off. |
| 3035474 | 4/1982 | Fed. Rep. of Germany |
| 2516017 | 7/1989 | France |
| 0130847 | 2/1987 | Japan |
| 1412152 | 10/1975 | United Kingdom |
| 2048209 | 6/1980 | United Kingdom |
| 2139948 | 11/1984 | United Kingdom |
| 2018676 | 5/1986 | United Kingdom |

OTHER PUBLICATIONS

U.S. Biaxially Oriented Polypr Battenfeld, 3–18.
Prandi . . . A company for the Research and Development of Machines for Flexible Packaging.
U.S. Battenfeld Line, Battenfeld, 3
U.S. Tafmer . . . A New Type Elast, Mitsui Petro, 1–6.
U.S. Extruding 'Linear Low' Pe, Plastics Technology.
Fountas, Article (Plastics World), "LLDPE", pp. 45–50, Feb. 81.
Smith et al., Article (Plastics Engineering), Dec. 82, pp. 37–41, "Stablizing LLDPE".

*Primary Examiner*—Edith Buffalow
*Attorney, Agent, or Firm*—J. J. Toney; William D. Lee, Jr.; Mark B. Quatt

[57] ABSTRACT

A coextruded multiple layer oriented film comprises a core layer of ethylene vinyl alcohol copolymer, two intermediate adhesive layers, and two outer layers of a blend of linear low density polyethylene and a very low density polyethylene. A preferred embodiment of the multilayer film exhibits improved heat seal strengths, and excellent optics and shrink properties while providing high oxygen barrier especially useful in food packaging applications.

7 Claims, 1 Drawing Sheet

U.S. PATENT DOCUMENTS

| | | | |
|---|---|---|---|
| 4,800,115 | 1/1989 | Havens | 428/178 |
| 4,801,486 | 1/1989 | Quacquarella et al. | 428/349 |
| 4,820,557 | 4/1989 | Warren | 428/349 |
| 4,833,024 | 5/1989 | Mueller | 428/349 |
| 4,837,084 | 6/1989 | Warren | 428/349 |
| 4,842,952 | 6/1989 | Garland | 428/518 |
| 4,853,265 | 8/1989 | Warren | 428/349 |
| 4,855,183 | 8/1989 | Oberle | 428/345 |
| 4,882,894 | 11/1989 | Havens et al. | 53/461 |
| 4,886,690 | 12/1989 | Davis et al. | 428/366 |
| 4,891,253 | 1/1990 | Mueller | 428/352 |
| 4,897,274 | 1/1990 | Candida et al. | 426/127 |

OXYGEN BARRIER BIAXIALLY ORIENTED FILM

This is a continuation application of application Ser. No. 842,321, filed on Mar. 21, 1986, now abandoned.

BACKGROUND OF THE INVENTION

This invention relates to oriented thermoplastic films for packaging; and more particularly, this invention relates to a coextruded, multilayer, oriented film having high oxygen barrier characteristics.

Thermoplastic film, and in particular polyolefin materials, have been used for some time in connection with packaging of various articles including food products which require resistance to abuse and stress, an attractive appearance, and protection from the environment, during the storage and distribution cycle.

Good heat seal strength is an essential prerequisite for thermoplastic films used in applications where a contained product puts stress on the heat seals, such as the transverse seals of pouches, bags, and other packaging made from such film. It is therefore advantageous to have a packaging film with improved heat seal strengths at given sealing temperatures, and a lower range of seal temperatures.

Suitable optical properties are also desirable in order to provide for inspection of the packaged product after packaging, in the distribution chain, and ultimately at point of sale. Optical properties such as high gloss, high clarity, and low haze characteristics contribute to an aesthetically attractive packaging material and packaged product to enhance the consumer appeal of the product.

Various polymeric materials have been used to provide lower gas permeability in order to reduce the transmission of oxygen through the packaging film and thereby retard the spoilage and extend the shelf life of products such as food items which are sensitive to oxygen. Ethylene vinyl alcohol copolymer (EVOH) is well known as an oxygen barrier material and has been used in the past in conjunction with multilayer packaging films. EVOH also provides a good barrier to odors or fragrances.

It is also desirable to include in a packaging film a shrink feature, i.e., the propensity of the film upon exposure to heat to shrink or, if restrained, create shrink tension within the packaging film. This property is imparted to the film by orientation of the film during its manufacture. Typically, the manufactured film is stretched in either a longitudinal (machine) direction, a transverse direction, or both, in varying degrees to impart a certain degree of shrinkability in the film upon subsequent heating. After being so stretched, the film is rapidly cooled to provide this latent shrinkability to the resulting film. One advantage of shrinkable film is the tight, smooth appearance of the wrapped product that results, providing an aesthetic package as well as protecting the packaged product from environmental abuse. Various food and non-food items may be and have been packaged in shrinkable films.

It is sometimes also desirable to orient the packaging film and thereafter heat set the film by bringing the film to a temperature near its orientation temperature. This produces a film with substantially less shrinkability, while retaining much of the advantages of orientation, including improved modulus and optical properties.

U.S. Pat. No. 4,064,296 issued to Bornstein et al discloses a film formed by the coextrusion of hydrolyzed ethylene vinyl acetate (HEVA) with outside layers of, for example, ethylene vinyl acetate copolymer (EVA).

Also of interest is U.S. Pat. No. 4,464,443 issued to Farrell et al showing the use of EVOH in a multilayer polymer structure, and including drying agents or desiccants such as sodium phosphate-di-basic and calcium chloride. EVOH, although a good barrier material, is moisture sensitive, and loses a great deal of its barrier properties at higher levels of relative humidity.

Also of interest is U.S. Pat. No. 4,457,960 issued to Newsome which discloses the use of EVOH and EVOH blends in a multiple layer film. The film may be made as shrinkable film, and may be melt extruded. The outside layer of the multiple layer film may be a blend of linear low density polyethylene (LLDPE) and EVA.

Also of interest is U.S. Pat. No. 4,495,249 issued to Ohya et al and disclosing a multilayer laminate film with a core layer of a saponified copolymer of ethylene and vinyl acetate, and including two outer layers of a mixture of EVA and LLDPE. The multilayer laminate film of this reference can be made heat shrinkable and has gas barrier properties.

U.S. Pat. No. 4,501,797 issued to Super et al discloses an unbalanced oriented multiple layer film including an intermediate layer of anhydride modified polypropylene and a barrier layer of a blend of ethylene vinyl alcohol and nylon.

U.S. Pat. No. 4,501,798 issued to Koschak et al also discloses the use of a blend of EVOH and nylon and an unbalanced multiple layer polymeric film also including LLDPE or EVA in a sealant layer. Adhesive layers of materials having carboxy moieties and preferably anhydride derivatives are present. The film of the reference is characterized by having high barrier to gaseous transmission, high gloss, transparency and stiffness.

U.S. Pat. No. 4,347,332 issued to Odorzynski et al discloses a film having a blend of nylon and ethylene vinyl alcohol copolymer.

U.S. Pat. No. 4,514,465 issued to Schoenberg discloses a five layered thermoplastic film, oriented and irradiated, having a three component blend of LLDPE, LMDPE, and EVA, and a four component surface layer having LLDPE, LMDPE, and EVA combined with a UV stabilizer.

It is an object of the present invention to provide a coextruded thermoplastic multilayer film characterized by good oxygen barrier properties over a wide range of moisture conditions.

It is also an object of the present invention to provide a coextruded thermoplastic multilayer film which is substantially free of voids in the barrier material of the film.

It is a further object of the present invention to provide a thermoplastic multilayer film having an aesthetic appearance with good clarity, and other desirable optical properties.

It is another object of the present invention to provide a thin thermoplastic multilayer film having superior toughness and abrasion resistance.

It is still another object of the present invention to provide a coextruded thermoplastic multilayer film which may be totally coextruded, and oriented to provide a film with good shrink properties and good barrier properties over a wide range of moisture conditions.

It is another object of the present invention to provide a thermoplastic multilayer film with good heat seal strength characteristics, and which may be heat sealed at relatively low temperatures.

SUMMARY OF THE INVENTION

The present invention relates to an oriented multilayer film comprising a cross-linked core layer comprising an ethylene vinyl alcohol copolymer; two cross-linked interior layers each comprising an adhesive polymeric material; and two cross-linked outer layers each comprising a blend of a linear low density polyethylene and a very low density polyethylene.

In another aspect of the invention, a method of making an oriented multilayer film comprises the steps of coextruding a core layer of an ethylene vinyl alcohol copolymer, two intermediate layers of an adhesive material, and two outer layers of a blend of a linear low density polyethylene and a very low density polyethylene; rapidly cooling the coextruded film; collapsing the cooled film; heating the collapsed film to its orientation temperature range; and stretching and orienting the heated film.

DEFINITIONS

"Intermediate layer", "interior layer", and the like are used herein to define a layer in a multilayer film enclosed on both sides by other layers.

The terms "ethylene vinyl alcohol copolymer", "EVOH", and the like are used herein to include saponified or hydrolyzed ethylene vinyl acetate copolymers.

The term "racking" is used herein to define a well-known process for stretching coextruded and reheated multilayer film by means of tenter framing or blown bubble processes.

The terms "linear low density polyethylene", "LLDPE", and the like are used herein to refer to copolymers of ethylene with one or more comonomers selected from $C_4$ to $C_{10}$ alpha oleofins such as butene-1, octene, etc. in which the molecules of the copolymers comprise long chains with few side chain branches or cross-linked structures. This molecular structure is to be contrasted with conventional low or medium density polyethylenes which are more highly branched than their respective counterparts.

"LLDPE" as defined herein has a density usually in the range of from about 0.916 grams per cubic centimeter to about 0.925 grams per cubic centimeter.

The terms "very low density polyethylene", "VLDPE" and the like as used herein refer to linear polyethylene copolymers having a density usually in a range of less than about 0.910 grams per cubic centimeter to about 0.860 grams per cubic centimeter.

The terms "oriented", "orientation" and the like are used herein to describe the process and resulting product characteristics obtained by stretching a resinous polymeric thermoplastic material which is heated to its orientation temperature range and then cooled in order to freeze the molecular alignment of the material in the direction of stretching. Orientation temperature ranges for a given film will vary with the different resinous thermoplastic materials or blends thereof which comprise the film. These temperature ranges are generally above room temperature and below the melting point of the thermoplastic material or blend of materials. Such ranges are well known to those skilled in the art. Uniaxial orientation results from a stretching force applied in one direction. Biaxial orientation results from a stretching force applied in two directions.

All compositional percentages used herein are calculated on a "by weight" basis.

The term "polyamide" and the like refers to high molecular weight polymers having amide linkages along the molecular chain, and refers more specifically to synthetic polyamide such as various nylons.

BRIEF DESCRIPTION OF THE DRAWINGS

Further details are given below with reference to the sole drawing figure where.

DESCRIPTION OF THE PREFERRED EMBODIMENTS

Figure 1:
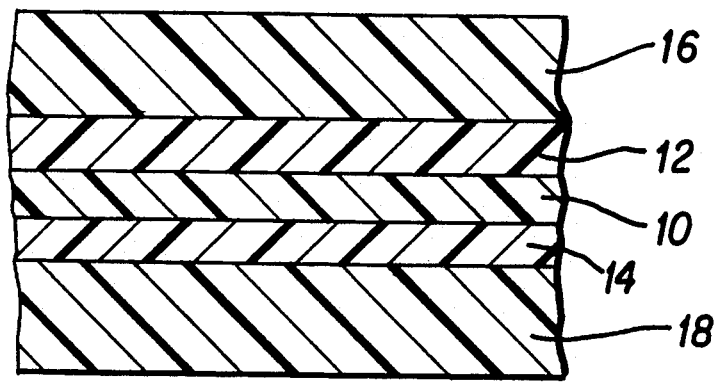
FIG. 1 is a schematic cross-section of a preferred embodiment of a multilayer film of the invention.

Referring specifically to the drawings, in FIG. 1, a schematic cross-section of the preferred embodiment of the coextruded multilayer oriented film of the invention is shown. Film structure is directed to a multilayer film having the generalized structure of A/B/C/B/A where A is an outer layer, B is an intermediate adhesive layer, and C is a core layer containing a barrier material. Preferably, the outer layers A each comprise about 35% of the total multilayer film thickness; the intermediate layers B each comprise about 10% of the film thickness, and the barrier layer C about 10% of the total film thickness. The total thickness of the multi-layer film is preferably between about 0.5 and 2.0 mils, and more preferably between about 0.75 and 1.5 mils. Even more preferably, the multi-layer film of the present invention is about 1 mil thick.

Preferably, core layer 10 is an ethylene vinyl alcohol copolymer. Core layer 10 is preferably between about 0.05 and 1 mil thick and more preferably about 0.1 mil thick. Thicknesses less than about 0.05 mils result in a very thin film with possible voids in the barrier material. Thicknesses greater than about 1 mil make the film difficult to stretch or rack, and also result in increased cost due to the expensive barrier component. A suitable EVOH is EVAL H commercially available from EVALCA.

Orienting EVOH to produce a heat shrinkable film has proven to be difficult. During the stretching or racking step for orienting such a film, the EVOH can sometimes develop voids. This phenomenon can result in some loss of oxygen barrier properties, which can affect, i.e. reduce the effective shelf life of food products packaged in EVOH film. The presence of voids in the EVOH layer can also result in discoloration of a food product, such as processed meat and therefore reduce the appearance and market value of a packaged food item.

It is therefore desireable in certain applications to blend the EVOH of the core layer with between 1 and 20 percent of a polyamide resin. The polyamide may be a polymer or copolymer comprising polyamide comonomers. When such a blend is used, the EVOH preferably comprises between about 80% and 99% by weight of the blend, and the polyamide comprises between about 1% and 20% by weight of the blend. More preferably, the blend comprises about 90% by weight of an ethylene vinyl alcohol copolymer, and about 10% of a polyamide.

Intermediate layers 12 and 14 are preferably acid or acid anhydride-modified polymeric material which can bond the core layer 10 to the outer layers 16 and 18. This material preferably includes a graft copolymer of a polyolefin, such as polyethylene, or ethylene-ester copolymer substrate and an unsaturated carboxylic acid or acid anhydride, blended with a polyolefin, such as polyethylene, or ethylene-ester copolymer.

Outer layers 16 and 18 are preferably a blend of LLDPE and VLDPE. These outer layers preferably include from about 70% to about 80% by weight of LLDPE, and from about 20% to about 30% by weight of VLDPE. More preferably, the outer layers 16 and 18 include about 75%, by weight, of a LLDPE, and about 25%, by weight, of VLDPE.

The film is preferably irradiated with between about 3 and 13 megarads (M.R.) of irradiation, even more preferably between about 5 and 10 M.R., prior to orientation of the film. Orientation is done by racking or stretching the film at a racking ratio of from between about 3.0 and about 5.0 times the original dimensions of the film in the longitudinal (machine) and transverse directions. To orient the film, e.g. in a blown bubble process, the coextruded and cooled tube is heated to its orientation temperature range. These ranges are well known for many polymeric materials, and are generally below the melting point of the film. Preferably, films made in accordance with the present invention are heated to between 90° C. and 140° C., and more preferably 105° C. and 115° C.

EXAMPLE 1

A sample film was prepared by blending 75% of LLDPE (Dowlex 2045) and 25% VLDPE (DFDA 1137) blended with about 2% of a masterbatch concentrate containing slip and antiblock additives. This outer blend layer was coextruded with a core layer containing a blend of 90% EVOH (EVAL H) and 10% of a nylon 6/nylon 12 copolymer (Grillon CA-6), and an intermediate adhesive (Norchem Plexar 3150).

The Dowlex 2045 may be obtained from Dow Chemical Company. This is an especially preferred LLDPE for use in this invention, and is a copolymer of ethylene and octene and has a density at 23° C. of about 0.920 grams per cubic centimeter and a melt flow index of from about 0.7 to about 1.2 grams per ten minutes (as measured by ASTM-D-1238, E-28). LLDPE adds toughness to the film.

The VLDPE has a preferred density of between 0.900 and 0.910 grams per cubic centimeter. A preferred resin is DFDA-1137 available from Union Carbide Corporation with a density of approximately 0.906 grams per cubic centimeter, a melt index of 0.721 grams per ten minutes, and a melting point of 244° F. This material is a butene based copolymer.

The EVOH of the core blend layer was EVAL H, available from EVAL Company of America and having an ethylene content of about 38% by weight and a melt index of about 1.5 grams/10 minutes. Other suitable EVOH resins include EVAL E, EVAL F, and EVAL K, as well as blends of the above, and preferably such resins or blends having a melt index of between about 1 to 4 grams per ten minutes (ASTM D 1238). Grillon CA-6, available from Emser Industries, was blended with the EVOH. The Grillon CA-6 is a nylon copolymer having about 60% nylon 6 and about 40% nylon 12 by weight.

Although nylon 12 would be effective alone as a blending material in the core layer, this is a relatively expensive material. Nylon 6 alone would be effective as a blending material, but with some difficulty in processing. The particular blend proved to be very advantageous in providing a core blend having the good barrier properties associated with EVOH, but with the processing and elongation advantages of nylon. Another suitable nylon copolymer is Grillon CR-9, having 20–30% nylon 6 and 70–80% nylon 12 by weight.

The intermediate adhesive material, Norchem Plexar 3150, is a low density polyethylene-based anhydride-modified resin produced by Norchem. Other anhydride-modified adhesives such as CXA-E162 (duPont) can also be used as the intermediate adhesive.

The polymer melt from the coextrusion die was then cooled and cast into a solid tape which was irradiated with about 8 megarads of irradiation. The tape was then heated to about 110° C. in an oven and blown into a bubble. The bubble was expanded to about 3.5 times its original dimensions in both the machine (longitudinal) and transverse directions, and then deflated and ply separated into single wound film rolls. The final film had a thickness of about one mil, and in addition to the shrunk properties imparted by orientation, exhibited excellent toughness, good optics, burn out resistance, resistance to tear propagation, and heat sealability. The film also exhibited good abuse resistance and the necessary stiffness and lower tack required for packaging applications and was substantially free of voids in the EVOH/polyamide blend layer.

EXAMPLE 2

Another sample film was prepared similar in construction to the sample film of Example 1, and prepared by a similar process. The LLDPE used in the outer layers of the sample was Exxon LL-3001.

The physical properties of the two sample films are set forth in Table I below.

TABLE I

| Property | Example 1 | Example 2 | Test Procedure |
|---|---|---|---|
| Tensile Strength (PSI) | | | |
| Longitudinal | 9,460 | 10,080 | ASTM D882-81 |
| Transverse | 8,260 | 9,300 | |
| Elongation at Break (Percentage) | 84 | 106 | ASTM D882-81 |
| Tear Propagation at 73° F. (Grams) | | | |
| Longitudinal | 14.00 | 17.63 | ASTM D1938-79 |
| Transverse | 13.69 | 21.13 | |
| Free Shrink at 240° F. (percent) | | | |
| Longitudinal | 66 | 66 | ASTM D2732-70 |
| Transverse | 65 | 64 | |
| Shrink Tension at 195° F. (PSI) | | | |
| Longitudinal | 292 | 348 | ASTM D2838-81 |
| Transverse | 360 | 377 | |
| Ball Burst Impact at 73° F. (CM-KG) | 11.1 | 13.6 | ASTM D3420-80 |
| Optical Properties at 73° F. | | | |
| Haze (Percent) | 5.7 | 3.1 | ASTM D1003 Method A |
| Clarity (percent) | 59.1 | 68.6 | ASTM D1746 |
| Gloss (45°) | 71. | 85. | ASTM 2457 |
| Water Vapor Transmission at 100° F. | | | |
| Grams/24 hours, 100 sq. in. 100% RH | 0.97 | 0.82 | ASTM F 372 |

TABLE I-continued

| Property | Example 1 | Example 2 | Test Procedure |
|---|---|---|---|
| (Gauge-mils) Oxygen Transmission at 73° F. | (1.06) | (1.22) | |
| CC (STP/24 hours, sq. meter, ATM) 0% RH | 9.5 | 8.6 | ASTM D3985-81 |
| (Gauge-mils) | (1.03) | (1.21) | |

To determine the seal strengths of the film of the present invention, a sample film was prepared substantially like that of Example 1, but utilizing CXA-E162 as the intermediate adhesive, and having no polyamide. This film is designated as Film A in Table 2 below.

For comparison, another film having substantially the same composition as Film A, but with a different outer blend layer was prepared. The outside layers of this film, designated Film B in Table 2 below, comprised a blend of 50% by weight of a linear low density polyethylene, 25% by weight of a linear medium density polyethylene, and about 25% by weight of an ethylene vinyl acetate copolymer.

The heat seal strengths indicated in Table 2 are in units of pounds per inch, as tested on a Vertrod heat sealing apparatus at sealing bar temperatures as indicated (ASTM F 88). Ten samples of Film A and ten samples of Film B were made and tested for heat seal strengths at each of two temperatures, 300° F. and 400° F.

The results are indicated in Table 2.

TABLE 2

| Sample | Film A (300° F.) | Film B (300° F.) | Film A (400° F.) | Film B (400° F.) |
|---|---|---|---|---|
| 1 | 5.4 | 4.6 | 4.8 | 4.9 |
| 2 | 5.8 | 4.0 | 5.6 | 4.8 |
| 3 | 5.5 | 4.8 | 6.1 | 4.8 |
| 4 | 5.7 | 4.7 | 5.4 | 4.9 |
| 5 | 4.7 | 4.7 | 5.4 | 3.4 |
| 6 | 5.7 | 4.5 | 5.4 | 6.3 |
| 7 | 4.8 | 3.9 | 5.4 | 5.6 |
| 8 | 5.3 | 4.7 | 5.1 | 5.4 |
| 9 | 5.6 | 4.7 | 4.9 | 5.4 |
| 10 | 4.8 | 4.5 | 5.4 | 5.0 |

Film A had an average heat seal strength of 5.3 pounds per inch at 300° F. and 5.4 pounds per inch at 400° F. sealing temperatures. In contrast, Film B had an average heat seal strength of 4.5 pounds per inch at 300° F., and 5.0 pounds per inch at 400° F. This calculates to an improvement of about 18% in heat seal strengths at 300° F., and an improvement of about 8% at 400° F. It should also be noted that film B has a thickness of about 100 gauge (i.e. about 1 mil.) compared to a thickness of about 90 gauge for film A. At these thicknesses, generally the thicker material will form a somewhat stronger heat seal at a given temperature. With this in mind, the comparative improvement in the film A in accordance with the invention would be even greater than that indicated above.

Obvious modifications to the invention may be made by one skilled in the art without departing from the spirit and scope of the claims as presented below.

What is claimed is:

1. An oriented multilayer film comprising:
    (a) a cross-linked core layer comprising an ethylene vinyl alcohol copolymer;
    (b) two cross-linked interior layers each comprising an adhesive polymeric material; and
    (c) two cross-linked outer layers each comprising a blend of (1) from about 70%, by weight, to about 80%, by weight of a linear low density polyethylene and (2) from about 20%, by weight, to about 30%, by weight, of a very low density polyethylene.

2. An oriented multilayer film comprising:
    (a) a cross-linked core layer comprising an ethylene vinyl alcohol copolymer;
    (b) two cross-linked interior layers each comprising an acid or acid anhydride-modified polymeric material; and
    (c) two cross-linked outer layers each comprising a blend of (1) about 75%, by weight, of a linear low density polyethylene and (2) about 25%, by weight, of a very low density polyethylene.

3. The film of claim 1 wherein the core layer further comprises a polyamide.

4. The film of claim 3 wherein the core layer comprises a blend of (1) between about 80% and 99% by weight of an ethylene vinyl alcohol copolymer, and (2) between about 1% and 20% by weight of a polyamide.

5. The film of claim 3 wherein the core layer comprises a blend of (1) about 90% of an ethylene vinyl alcohol copolymer, and (2) about 10% of a polyamide.

6. The film of claim 1 which has been oriented by racking at a racking ratio of from about 3.0 to about 5.0 in both the longitudinal and transverse directions.

7. The film of claim 6 which has been oriented by racking at a racking ratio of about 3.5 in both the longitudinal and transverse directions.

* * * * *